Dec. 29, 1964 DUNCAN TONG 3,163,574
ARTIFICIAL CHRISTMAS TREES
Filed Nov. 14, 1962 2 Sheets-Sheet 1

INVENTOR
DUNCAN TONG
BY
ATTORNEY

Dec. 29, 1964
DUNCAN TONG
3,163,574
ARTIFICIAL CHRISTMAS TREES
Filed Nov. 14, 1962
2 Sheets-Sheet 2
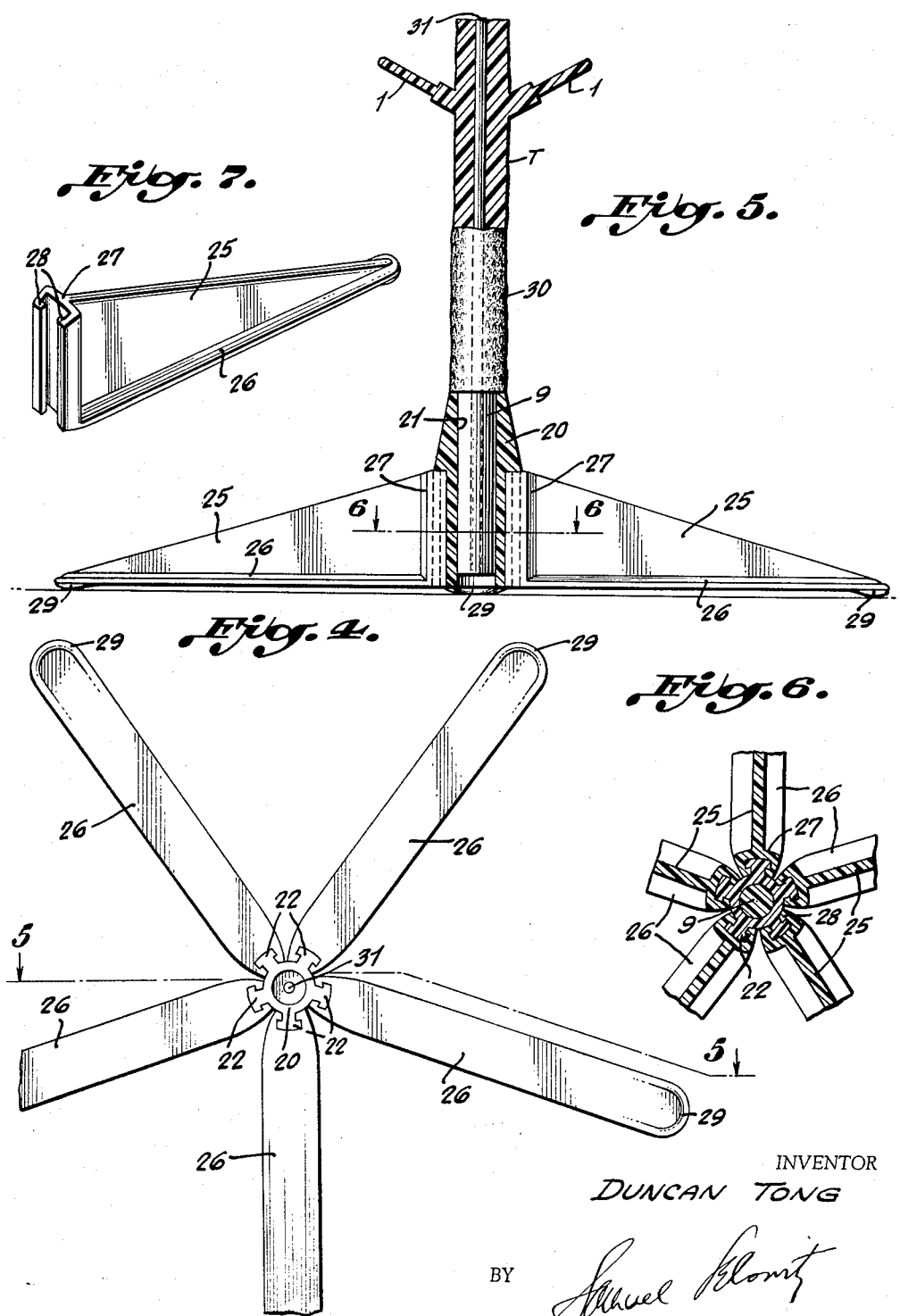
INVENTOR
DUNCAN TONG
BY
ATTORNEY

United States Patent Office 3,163,574
Patented Dec. 29, 1964

3,163,574
ARTIFICIAL CHRISTMAS TREES
Duncan Tong, Central Bldg., 3 Pedder St.,
Victoria, Hong Kong
Filed Nov. 14, 1962, Ser. No. 238,327
3 Claims. (Cl. 161—24)

This invention relates to a knock-down artificial Christmas tree and one particularly adapted for indoor use.

It is the object of the present invention to provide an attractive table style Christmas tree formed of a plurality of components of plastic material which may be fabricated at low cost and which may be shipped in a knock-down state for assembly by the consumer to obtain an ornamental tree for indoor use which resembles very closely a natural tree.

It is another object of the invention to provide an artificial Christmas tree which may be assembled and disassembled easily in order to store the same for use at successive seasons. The tree is formed of materials which may be washed easily in order to maintain its cleanliness and the character of the plastic is such that the same does not fade in the course of time.

It is another object of the invention to provide artificial Christmas trees of varying sizes which may be ornamented in any desired way and which resemble closely small pine trees found in nature, including clusters of green pine needles and pine cones which simulate such plant components growing on branches of a natural tree.

It is a further object of the invention to provide a rugged and reliable base for the tree which will afford a stable support for the upstanding trunk, and which can nevertheless be disassembled in its component parts to occupy a minimum amount of space.

Other objects and purposes will appear from the detailed description of the invention following hereinafter, taken in conjunction with the accompanying drawings, wherein FIG. 1 is a perspective view of the artificial Christmas tree in accordance with the invention;

FIG. 4 is a bottom view of the base of the tree to provide a stable support for the trunk extending upwardly therefrom;

FIG. 5 is a vertical sectional view along line 5—5 of FIG. 4;

FIG. 6 is a horizontal sectional view along line 6—6 of FIG. 5; and

FIG. 7 is a perspective view of one of the component feet of the base.

Figure 1:

In FIG. 1 is illustrated an artificial Christmas tree formed of plastic material and resembling a natural pine tree. This tree may be set up in the home, on a table or mantel, and decorated in the same manner as a natural Christmas tree, but without fear of drying and falling of the pine leaves and the attendant inconveniences caused thereby. The invention seeks to obtain an artificial tree which resembles closely those found in nature and which does not appear artificial, as is the case with the artificial trees disclosed in the U.S. patents to Warren, Nos. 2,826,845 and 2,826,846.

The tree in accordance with the invention lends itself to mass production molding techniques and consists essentially of a trunk T formed of plastic material of brown color, with the exterior surface thereof molded with roughenings 30 to simulate a natural tree. The trunk is preferably reinforced with a wire rod 31 in order to maintain its vertical rigidity and to serve as a reliable support for the branches that are detachably affixed thereto.

Figure 2:
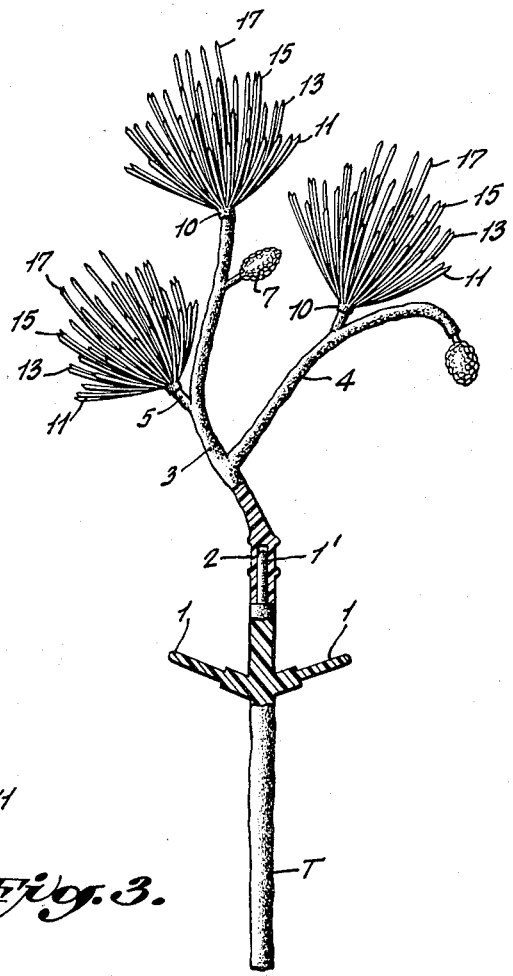
FIG. 2 is a front elevation of the top end of the tree, with parts in section, to illustrate the details of a tree branch at the tip of the tree, and which is employed in different lengths, contours and distribution of plant components at the different levels of the tree.

A plurality of posts 1 are molded integrally with the trunk and project radially therefrom at different levels thereof. These posts are preferably five in number and are equidistantly spaced around the periphery of the trunk at each level so that an acute angle of approximately 72° is formed between each post. The respective posts are in alignment with each other along the length of the trunk and are directed at substantially the same inclination to the horizontal at all levels of the trunk. In order to simulate a natural tree, the spacing between the levels of the posts diminishes gradually from the lower end of the tree to the tip thereof. Thus, while the spacing between the posts near the bottom of the tree may be 2½", this spacing gradually diminishes in ¼" increments to 1¾" near the tip of the tree. In the illustrated embodiment, a tree of approximately 20" in height may have nine levels of posts for affixation thereto of the main branches. In addition, a post 1' is provided at the tip of the trunk for the affixation of a top branch to simulate the top growth of a natural tree, as shown in FIG. 2.

The branches of the tree vary in length and spread, as shown in FIG. 1, and diminish in size gradually from the lower end of the tree to the upper end thereof. The branches at each level are identical and are formed of main branches 3 of brown plastic material having a socket 2 at the base end thereof for detachably engaging the posts 1 and 1' projecting from the trunk. Each branch 3 is formed with plant elements such as branch stalks 4 and 5 which are molded integrally with the main branches 3 and these may be of different number, directions and contours at the different levels of the tree trunk and at the tip of the tree. However, all of these branches and branch stalks are molded with posts 8 upon which are adapted to be mounted a plurality of successive rings with pine needles projecting therefrom, in order to simulate the pine leaves of a natural tree.

In addition, the branches and branch stalks 3, 4 and 5 have integrally molded therewith brown roughened plant elements 7 which resemble pine cones, commonly forming the growth of natural pine trees.

As stated above, the several branches mounted upon the successive levels of posts 1 vary along the length of the tree and, of course, those of larger size bear a greater number of pine needle clusters and cones, as is found on natural trees. Thus, the branches 3 extending from the posts 1 at the first two levels of the tree, which may be spaced 2½" apart, may be approximately 8" long with a spread of 6", and with a distribution of thirteen clusters of pine leaves and seven cones at different points thereof. The sameness of the branches at the first two levels results in molding economies, but in the cases of the fabrication of small trees, say with only six levels of branches, it may be necessary to grade the sizes of the branches at each successive level.

The branches in the third and fourth rows from the base may be reduced in size to approximately 6½" in length, with a spread of 4½", and are molded with nine supporting posts for the pine needle clusters and with six cones. The fifth row of branches from the base may be 5" long with approximately the same spread, but with a reduced number of pine needle clusters, such as seven, and three pine cones.

The sixth and seventh rows may be 4½" to 4" long, with a slightly reduced spread, and with the pine clusters reduced to five and three, respectively, and the pine cones correspondingly. The eighth and ninth rows, which are now displaced from each other approximately 1¾" may have branches of approximately 2½″ long and 1½″ spread, with single cones thereon, and the top branch 3, illustrated in detail in FIG. 2 of the drawing, may have three pine needle clusters and two pine cones molded integrally therewith.

The specific description above is merely illustrative of many variations which may be made to attain the desired ornamental appearance of the artificial tree.

Figure 3:
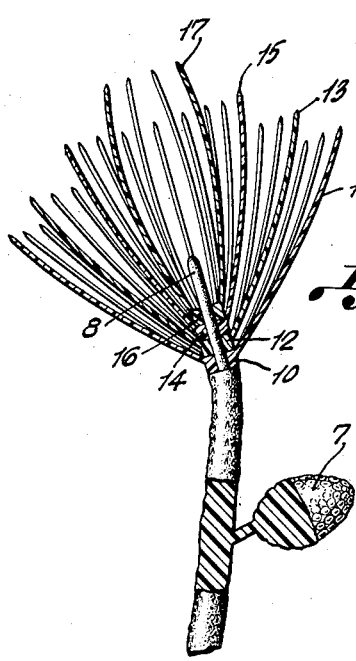
FIG. 3 is a sectional view, with certain parts in elevation, to show the construction of the clusters of pine needles on the branches of the tree to obtain a simulation of pine leaves and pine cones growing on branches of a conifer tree.

As shown in FIG. 3, each pine needle cluster is preferably formed of four successive rings of green plastic material 10, 12, 14 and 16, respectively, which are successively mounted upon each post 8 in frictional engagement therewith. A plurality of pine needles 11, 13, 15 and 17 extend from the outer periphery of each of the rings 10, 12, 14 and 16, respectively, in diverging directions and lie along substantially conical planes relative to the axis of the post 10, with the angles of these planes decreasing progressively from the substantially conical planes containing the needles 11 to the one containing the needles 17. Of course, because the needles are of thin filamentary dimensions, they curve as do pine needles in nature and as is illustrated in FIG. 3. In order to simulate even more closely the natural growth of pine leaves, the innermost ring 16 with the pine needles 17 extending from the periphery thereof, is molded of plastic material of lighter color to simulate new plant growth.

The tree with its several component parts described above may be detachably supported in any suitable base, in dependence upon the size thereof.

In FIGS. 4 to 7 is illustrated a stable base for a tree of approximately 20″ to 24″, which may be molded economically and which may be assembled and disassembled easily to provide a stable support for the tree described above. In the illustrated embodiment, a central core 20 of plastic material is formed with an internal bore 21 for the purpose of receiving therein a reduced extension 9 of the trunk which is preferably roughened in order to obtain a tight frictional engagement between the lower end of the trunk and the core.

A plurality of vertical guideways, preferably formed as five T-shaped flanges 22, are molded on the exterior surface of the core, as clearly shown in FIGS. 4 and 6.

A plurality of feet 25, and specifically five in number, are designed to engage with the external lateral surface of the core 20 to form a stable support for the latter by virtue of the substantial horizontal area spanned by the feet 25. Each foot is formed of a vertical web having a horizontal flange 26 molded on the base thereof, and a vertical flange 27 at the inner extremity thereof provided with inwardly facing jaws 28 which embrace the corresponding T-shaped flanges formed on the exterior of the core. The flanges 27 are interfitted with the flanges 22 by a vertical reciprocating movement relative to the lower end of the core 20 so that the interengagement of the five feet 25 with the central core provides a stable support for the trunk T of the tree and the branches and simulated plant growth borne thereby. Limited line contact for the base is afforded by U-shaped fillets 29 at the free ends of the flanges 26 so that the base may rest on a table without possibility of rocking.

The tree construction described above permits an easy dismantling thereof for storage. The base may be taken apart in its six compact rod-like parts. The five branches at each level of the tree may be pulled from the respective posts 1 and packaged separately with a numerical notation of the level of the tree to which they appertain. The unitary trunk constitutes the longest element in the assembly, all of which may be boxed conveniently for storage awaiting the next occasion for use.

All of the plastic parts lend themselves to easy cleaning, if such is desired, since all that is required is the rinsing thereof in lukewarm water with a mild detergent.

While I have described my invention as embodied in a specific form and as operating in a specific manner for purposes of illustration, it should be understood that I do not limit my invention thereto, since various modifications will suggest themselves to those skilled in the art without departing from the spirit of my invention, the scope of which is set forth in the annexed claims.

I claim:

1. A knock-down artificial Christmas tree simulating an evergreen pine tree having a plurality of branches of brown plastic material provided with posts for detachably mounting thereon clusters of pine leaves of green plastic material, each cluster being composed of a plurality of superposed rings with each ring having an apertured center adapted to frictionally engage one of said posts, a plurality of pine needle leaves molded integrally with each ring and extending from the periphery of each ring transversely to the plane thereof along substantially conical planes relative to the axis of said post, and the successive rings mounted on each post having the conical planes containing the pine needles decrease in angularity with respect to said axis.

2. A device as set forth in claim 1 wherein the last ring of pine needles in each cluster is of lighter green color than the preceding rings to simulate new plant growth.

3. A device as set forth in claim 1 wherein the plurality of branches are provided with simulated pine cones of brown plastic material molded integrally therewith.

References Cited by the Examiner

UNITED STATES PATENTS

| | | | |
|---|---|---|---|
| 2,826,846 | 3/58 | Warren | 161—24 |
| 3,115,435 | 12/63 | Abramson | 161—24 |

FOREIGN PATENTS

| | | |
|---|---|---|
| 580,003 | 7/58 | Italy. |
| 1,143,738 | 4/57 | France. |
| 1,219,368 | 12/59 | France. |

EARL M. BERGERT, *Primary Examiner.*

JACOB STEINBERG, *Examiner.*